US012068557B2

(12) United States Patent
Brennan et al.

(10) Patent No.: US 12,068,557 B2
(45) Date of Patent: *Aug. 20, 2024

(54) ELECTRICAL CONNECTOR WITH REMOVABLE LOAD BAR

(71) Applicant: Sentinel Connector Systems, Inc., York, PA (US)

(72) Inventors: Robert Brennan, York, PA (US); Randy Schwartz, York, PA (US)

(73) Assignee: Sentinel Connector Systems, Inc, York, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/099,563

(22) Filed: Jan. 20, 2023

(65) Prior Publication Data

US 2023/0155316 A1 May 18, 2023

Related U.S. Application Data

(63) Continuation of application No. 17/202,536, filed on Mar. 16, 2021, now Pat. No. 11,594,836.

(51) Int. Cl.

| | |
|---|---|
| ***H01R 13/506*** | (2006.01) |
| ***H01R 13/41*** | (2006.01) |
| ***H01R 24/64*** | (2011.01) |
| ***H01R 107/00*** | (2006.01) |

(52) U.S. Cl.
CPC .......... *H01R 13/506* (2013.01); *H01R 13/41* (2013.01); *H01R 24/64* (2013.01); *H01R 2107/00* (2013.01)

(58) Field of Classification Search
CPC ...... H01R 13/506; H01R 13/41; H01R 24/64; H01R 2107/00
See application file for complete search history.

(56) References Cited

U.S. PATENT DOCUMENTS

| | | | | |
|---|---|---|---|---|
| 6,402,559 | B1 * | 6/2002 | Marowsky | H01R 13/6463 439/676 |
| 8,245,395 | B2 * | 8/2012 | Elias | H01R 24/64 29/862 |
| 9,543,729 | B2 * | 1/2017 | Sullivan | H01R 24/28 |
| 11,594,836 | B2 * | 2/2023 | Brennan | H01R 13/41 |

* cited by examiner

*Primary Examiner* — Briggitte R. Hammond
(74) *Attorney, Agent, or Firm* — KCO Legal, Inc

(57) ABSTRACT

A modular plug system including a plug housing including a top surface, bottom surface and two opposing side surfaces, a front end and an opening opposite the front end, and a cavity extending from the front end to the opening in the back end, a load bar sized to engage the cavity in the modular plug, the load bar including two extensions on an upper surface of the load bar, the extensions sized to engage two openings in the top surface of the plug housing when the load bar is inserted into the cavity.

10 Claims, 9 Drawing Sheets

ELECTRICAL CONNECTOR WITH REMOVABLE LOAD BAR

CROSS-REFERENCE TO RELATED APPLICATIONS

This is application is a continuation of U.S. application Ser. No. 17/202,536 filed Mar. 16, 2021, which is fully incorporated herein by reference.

BACKGROUND OF THE PRESENT INVENTION

As more and more devices incorporate network connectivity, termination of network connectors takes place outside a closed environment on a more regular basis. Terminating a connector in the field raises many issues including poor connectivity resulting from improper insertion of wires into modular connectors. Improper terminations can lead to degraded device performance or device failure. With a traditional modular plug, wires are hand cut to a length that will allow the wires to engage with the crimping portion of the plug. However, many times the wires are cut inconsistent lengths such that the wire do not fully engage the crimping portion of the plug resulting in a bad connection.

A need exists for a plug that will allow for easy insertion an crimping of cables in the field.

SUMMARY OF THE PRESENT INVENTION

One embodiment of the present disclosure includes a modular plug system including a plug housing including a top surface, bottom surface and two opposing side surfaces, a front end and an opening opposite the front end, and a cavity extending from the front end to the opening in the back end, and a load bar sized to engage the cavity in the modular plug, the load bar including two extensions on an upper surface of the load bar, the extensions sized to engage two openings in the top surface of the plug housing when the load bar is inserted into the cavity.

One embodiment of the current disclosure includes a modular plug system including a plug housing including a top surface, bottom surface and two opposing side surfaces, a front end and an opening opposite the front end, and a cavity extending from the front end to the opening in the back end, a load bar sized to engage the cavity in the modular plug, the load bar including two extensions on an upper surface of the load bar, the extensions sized to engage two openings in the top surface of the plug housing when the load bar is inserted into the cavity.

Another embodiment includes a front side of each extension portion is sloped towards a front end of the load bar.

In another embodiment each extension portion is sized to prevent the load bar from exiting the cavity after the load bar is installed.

In another embodiment the load bar includes a plurality of holes sized to each accommodate a wire.

In another embodiment each hole in the load bar is sized to concentrically align with one of a plurality of holes in the front end of the modular plug.

In another embodiment the extensions push the load bar towards the bottom of the housing.

In another embodiment the front end of the housing includes a single row of openings.

In another embodiment the front end of the housing includes multiple rows of openings.

In another embodiment a wire passed through one opening in the load bar is guided to a corresponding opening in the front of the modular plug.

In another embodiment the top of the extension portion is coplaner with the top surface of the plug.

Another embodiment includes a modular plug system including a plug housing including a top surface, bottom surface and two opposing side surfaces, a front end and an opening opposite the front end, and a cavity extending from the front end to the opening in the back end, a load bar including a guidance portion connected to a management portion that is sized to engage the cavity in the modular plug, the management portion including two extensions on an upper surface of the management portion, the extensions sized to engage two openings in the top surface of the plug housing when the load bar is inserted into the cavity.

In another embodiment a front side of each extension portion is sloped towards a front end of the load bar.

In another embodiment each extension portion is sized to prevent the load bar from exiting the cavity after the load bar is installed.

In another embodiment the guidance portion includes a plurality of holes sized to each accommodate a wire.

In another embodiment each hole in the guidance portion is sized to concentrically align with one of a plurality of holes in the front end of the modular plug.

In another embodiment the extensions push the management portion towards the bottom of the housing.

In another embodiment the front end of the housing includes a single row of openings.

In another embodiment the front end of the housing includes multiple rows of openings.

In another embodiment a wire passed through one opening in the guidance portion is guided to a corresponding opening in the front of the modular plug.

In another embodiment the top of the extension portion is coplaner with the top surface of the plug.

DRAWING SUMMARY

DETAILED DESCRIPTION

Figure 1:
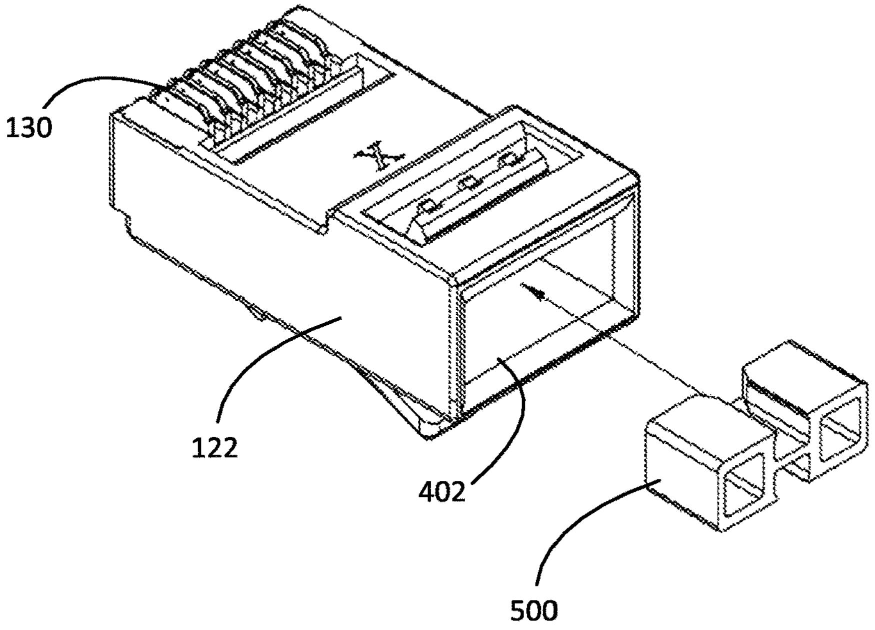
FIG. 1 depicts a perspective view of a load bar being inserted into the opening of the modified connector housing.
Figure 12:
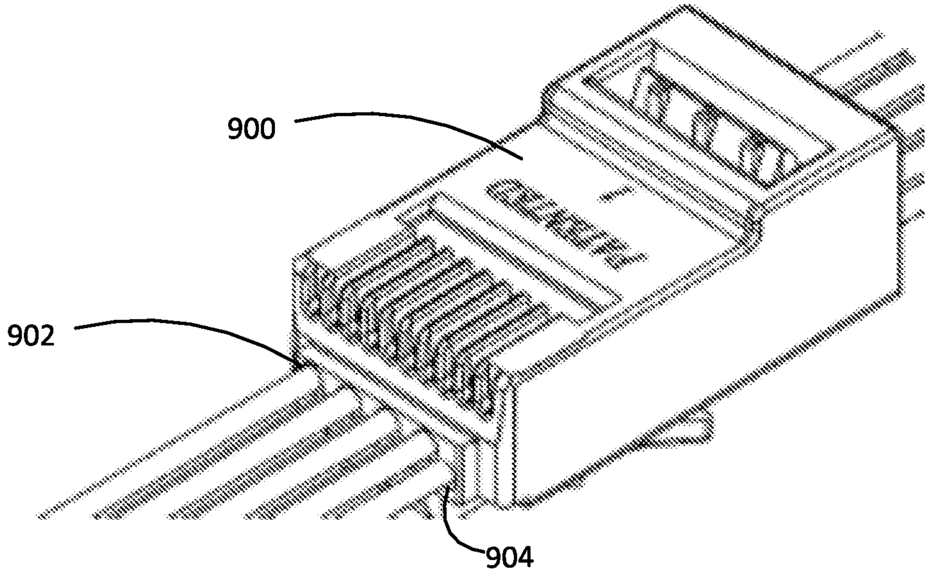
FIG. 12 depicts a cut away view of a multi row plug with a load bar inserted into the plug.

FIG. 1 depicts a perspective view of a load bar 500 being inserted into the opening of the modified connector housing 122. The modified connector housing 122 includes an opening 402. The load bar 500 is sized such that the load bar 500 can be inserted into the opening 402. FIG. 12 depicts a cut away side view of the modular connector housing 122 with the load bar 500 inserted into the opening 402. When inserted, a front surface of the load bar 500 is adjacent to a plurality of wiring channels 404. The load bar 500 is positioned in the opening 402 such that each wire of a plurality of wires inserted into the opening 402 are guided into a respective wire channel 404.

Figure 2:
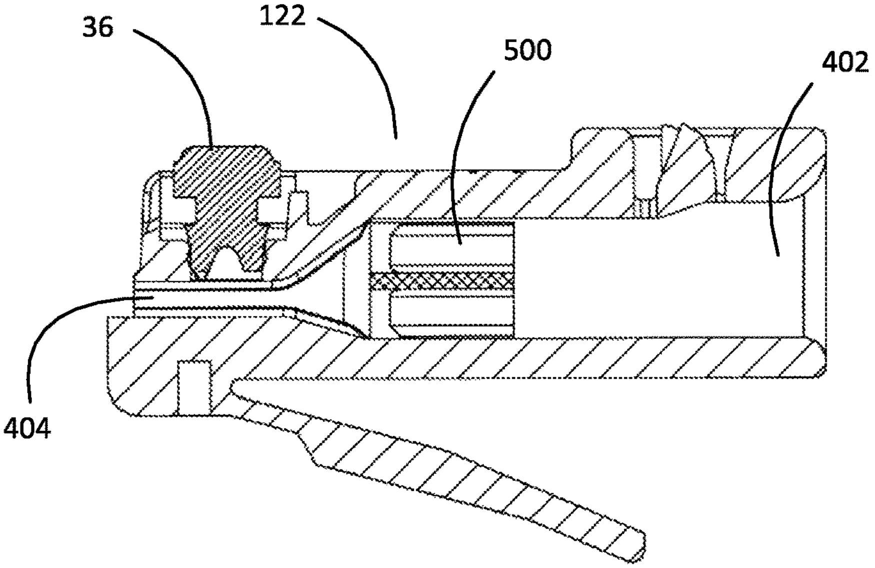
FIG. 2 depicts a rear view of the modular connector housing with the load bar inserted into the opening.

FIG. 2 depicts a rear view of the modular connector housing 122 with the load bar 500 inserted into the opening 402. The load bar 500 includes four openings 502, 504, 506 and 508. In one embodiment, the openings 402 are arranged in a single row and three of the four openings 502, 504 and 506 are arranged such that each of the openings 502, 504 and 506 align with at least two wiring channels 404. In another embodiment, the openings 402 are arranged into multiple rows and the openings 502, 504, 506 and 508 are arranged such that each opening is aligned with at least one opening 402.

Figure 3:
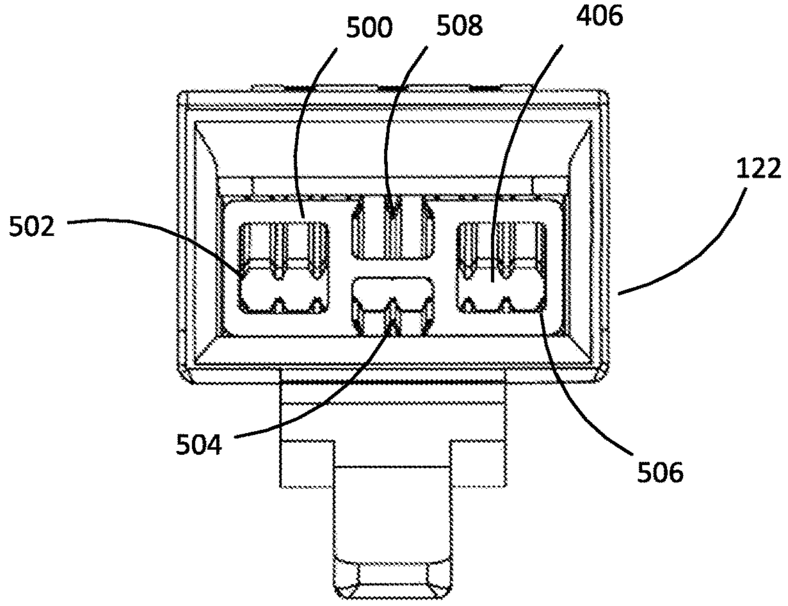
FIG. 3 depicts a perspective cut away view of the modular connector housing.
Figure 4:
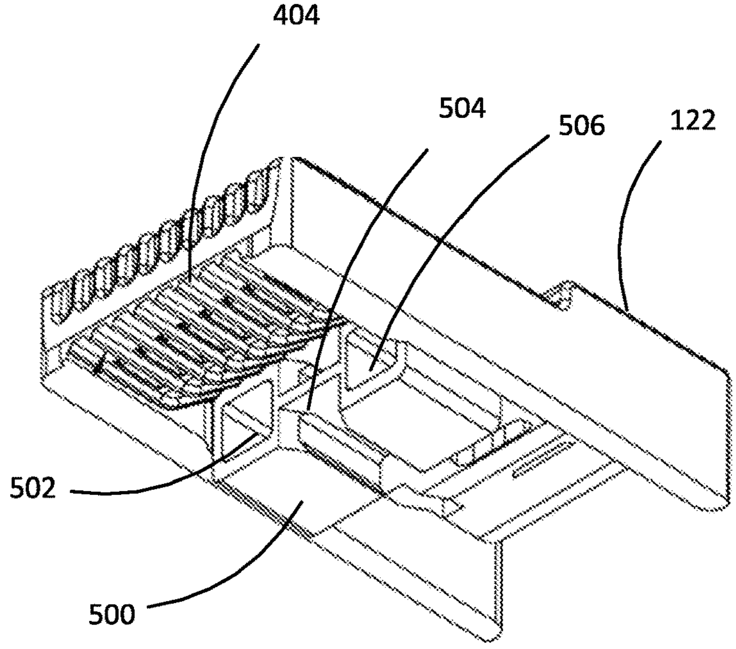
FIG. 4 depicts another perspective cut away view of the modular connector housing.
Figure 5:
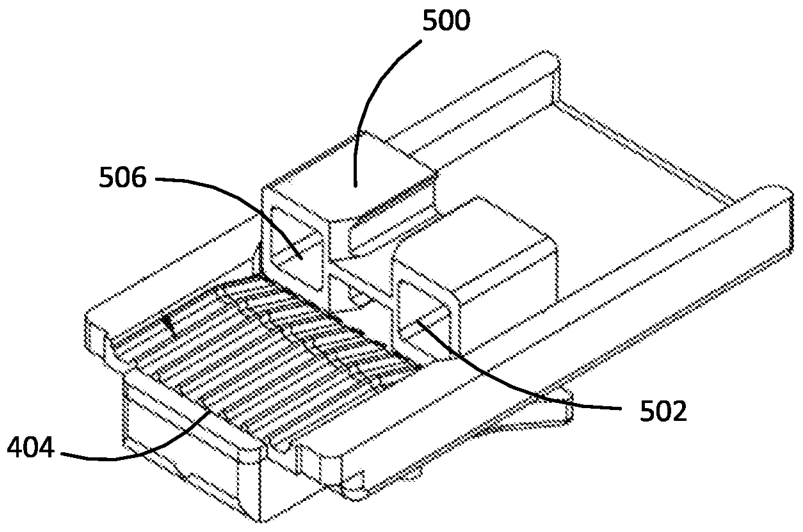
FIG. 5 depicts a cut away view of the modular connector housing.

FIG. 3 depicts a perspective cut away view of the modular connector housing. The load bar 500 is positioned adjacent to the wiring channels 402 such that wires pass through the openings 502, 504, 506 and 508 of the load bar 500 to engage the wiring channels 402. FIG. 4 depicts another perspective cut away view of the modular connector housing. FIG. 5 depicts a cut away view of the modular connector housing. The load bar 500 is positioned such that wires passing through the openings 502, 504, 506 and 508 are positioned in the wiring channels 402 such that the contact blades 36 engage each wire in each wiring channel 402 when the modular connector housing 122 is crimped.

Figure 6:
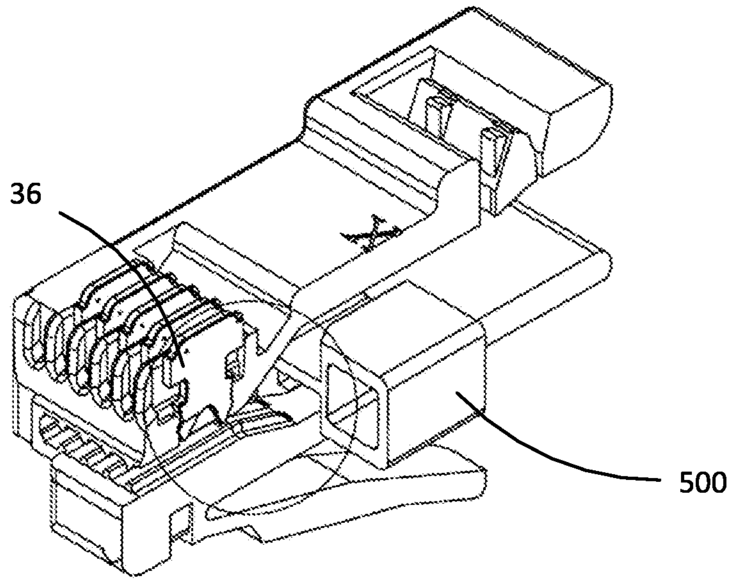
FIG. 6 depicts an embodiment of a plug and a load bar.

FIG. 6 depicts an embodiment of a plug 600 and a load bar 700. The load bar 700 includes a wire management portion and a load portion 704. The wire management portion 702 includes a plurality of wiring channels 706 that are sized to each engage a wire extending from the load portion 704. When positioned in the plug 600, each wiring channel 706 is aligned with one opening 602 in the plug 600 to allow a wire to extend outward form the opening 602. The load portion 704 includes flanges 708 and 710 that extend from a central base portion. Each flange 708 and 710 includes a locking unit 712 and 714 with the locking units 712 and 714 being positioned on the top surface of each flange 712 and 714 such that each locking portion 712 and 714 engages an opening 604 and 606 in the top surface of the plug 600.

Figure 7:
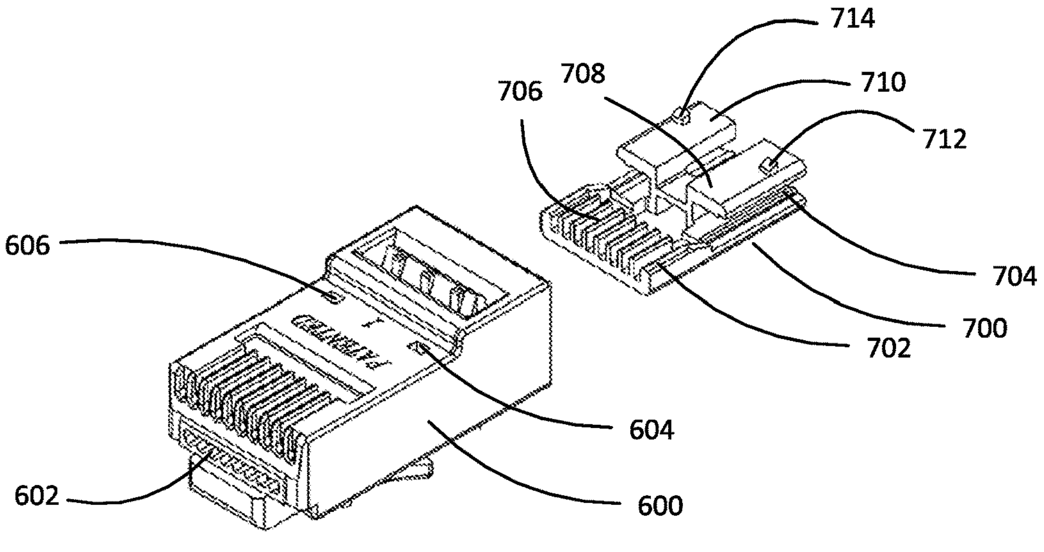
FIG. 7 depicts a cut away view of the plug and load bar.
Figure 8:
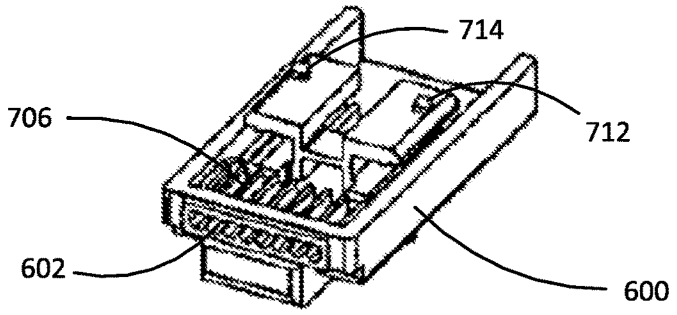
FIG. 8 depicts a cut away view of the load bar being inserted into the plug.

FIG. 7 depicts a cut away view of the plug 600 and load bar 700. The load bar 700 is sized to rest in a cavity inside the plug 600. The wire channels 706 are positioned on the load bar 700 such that each wire channel 706 is aligned with a respective opening 602. The flanges 708 and 710 are positioned such that the flanges do not interfere with the sides or top of the plug 600 and the locking units 712 and 714 are positioned such that the locking units 712 and 714 engage an opening 604 and 606 on the plug. FIG. 8 depicts a cut away view of the load bar 700 being inserted into the plug. In one embodiment, the lower inner surface of the plug includes a step down portion 608 to accommodate larger cables.

Figure 9:
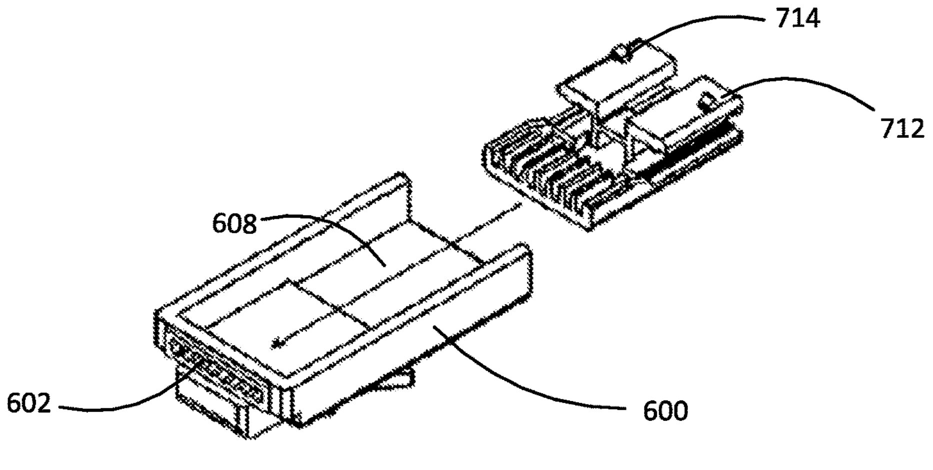
FIG. 9 depicts a partial cut away view of the plug and load bar.
Figure 10:
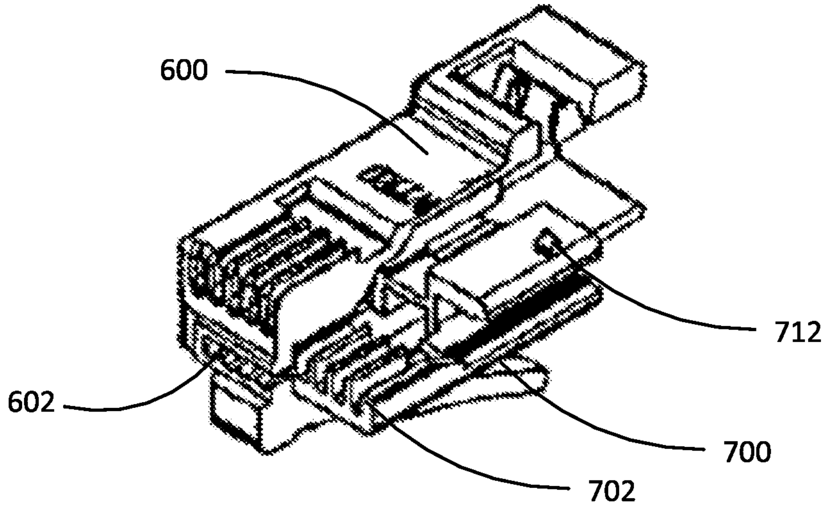
FIG. 10 depicts a close up view of the locking unit.

FIG. 9 depicts a partial cut away view of the plug 600 and load bar 700. When inserted into the plug, the flanges 708 and 710 bend as the locking units 712 and 714 come into contact with the upper inner surface of the plug 600. The flanges 708 and 710 move upward as the locking units 712 and 714 engage the openings 604 and 606. FIG. 10 depicts a close up view of the locking unit 712. Each locking unit 712 and 714 has a top surface 800 that slopes towards the openings 602 in the plug 600. The locking units 712 and 714 include a front wall 802 and a back wall (not shown) that extend from the flange 708 or 710. When the top surface 800 comes into contact with an inner surface of the plug 600, the sloped surface 800 deflects the flange 708 or 710 down to allow the locking unit 712 and 714 to engage the openings 604 and 606.

Figure 11:
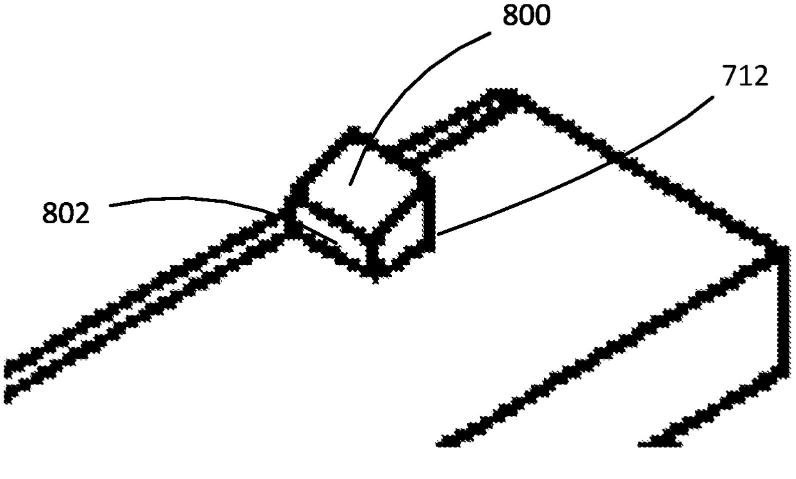
FIG. 11 depicts a perspective view of a multi row plug.

FIG. 11 depicts a perspective view of a multi row plug 900. The plug 900 includes a first row 902 of openings and a second row 904 of openings. In one embodiment, the plug includes more than two rows of openings. The openings may be concentrically aligned or staggered. Each of the openings is configured to align with a channel in the load bar (not shown) such that wires extending through each channel in the load bar (not shown) extend through a respective opening in the first row 902 or second row 904 of openings. FIG. 12 depicts a cut away view of a multi row plug 1000 with a load bar 1002 inserted into the plug 1000. The load bar includes a first row of openings 1004 and a second row of openings 1006. The openings 1004 and 1006 in the load bar 1002 are aligned with openings in a first row 902 and second row of the plug 1000 such that each wire that extends through an opening 1004 and 1006 in the load bar 1002 extends through a respective opening in the plug 1000.

Figure 13:
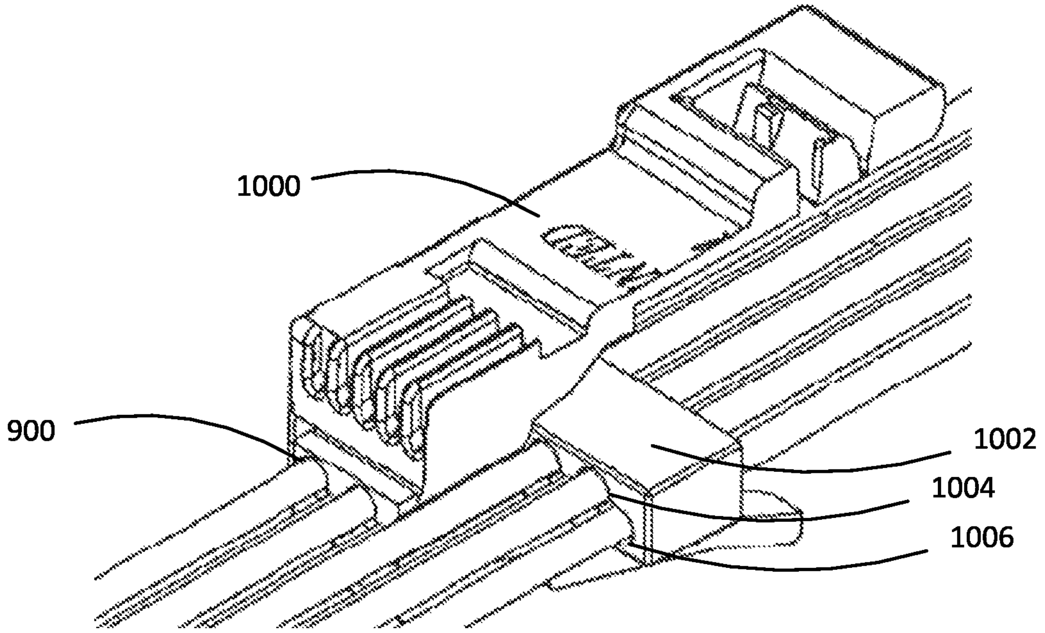
FIG. 13 depicts another embodiment of a multi row plug.
Figure 14:
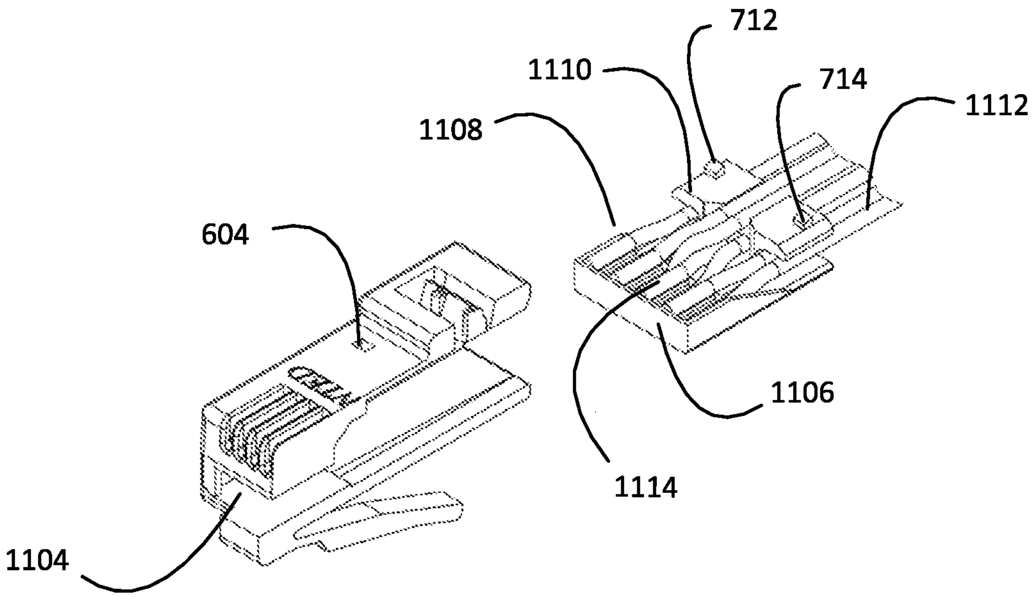
FIG. 14 shows a breakaway view of the plug and load bar.

FIG. 13 depicts another embodiment of a multi row plug 1100. The plug 1100 includes openings 602 and 604 to engage the load bar, a front surface 1102, and an opening 1104 in the lower portion of the front surface. The opening 1104 is configured to accommodate the front surface of a load bar 1106 inserted into the plug 1100. FIG. 14 shows a breakaway view of the plug 1100 and load bar 1108. The plug 1100 has an opening 1104 in the front surface that extends through the length of the plug 900. The load bar 1108 includes the front surface 1106, a wire support structure 1110, two locking units 712 and 714 on a top surface of the wire support structure 1110. A plurality of wires 1112 pass through the support structure 1110 with each wire 1112 exiting the support structure and engaging one of a plurality of channels 1114 in the front portion of the load bar 1108. The wires 1112 are cut to a length such that the front surface of each wire 1112 extends to the back of the front surface 1106 of the load bar 1108.

Figure 15:
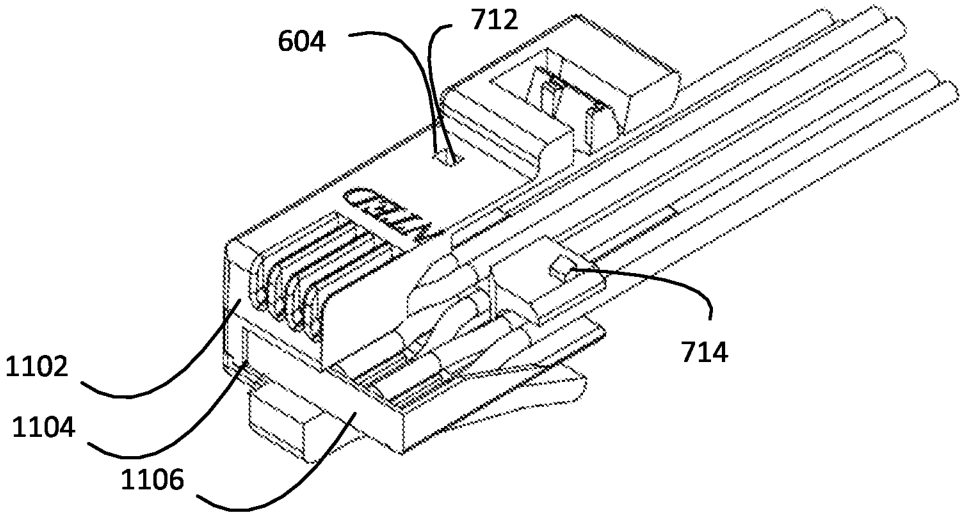
FIG. 15 depicts a cut away view of the plug with the load bar inserted into the plug.
Figure 16:
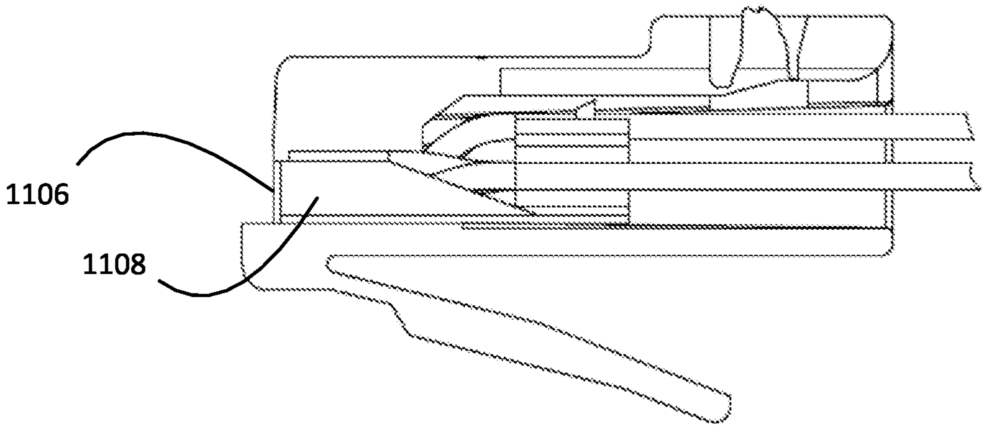
FIG. 16 depicts a side cut away view of the plug showing the front surface of the load bar being co-plainer with the front surface of the plug.
Figure 17:
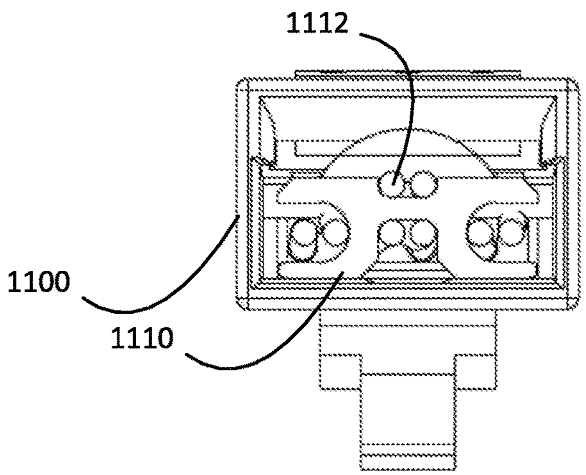
FIG. 17 shows the arrangement of wires in the load bar.

FIG. 15 depicts a cut away view of the plug 1100 with the load bar 1108 inserted into the plug 1100. The front surface 1106 of the load bar 1108 is co-planer with the front surface 1102 of the plug 1100 such that the front surface 1106 of the load bar 1108 acts to fill the opening 1104 in the plug 1100. FIG. 16 depicts a side cut away view of the plug 1100 showing the front surface 1106 of the load bar 1108 being co-plainer with the front surface 1102 of the plug 1100. FIG. 17 shows the arrangement of wires 1112 in the load bar 1108. The wires 1112 are separated into two levels with two wires 1112 being positioned in different portions of the support structure 1110. Each wire exiting the load bar enters into a channel 1114 in the load bar 1108. In one embodiment, the channels 1114 are arranged in a multi row configuration. In another embodiment, the channels 1114 are arranged in a single row.

Figure 18:
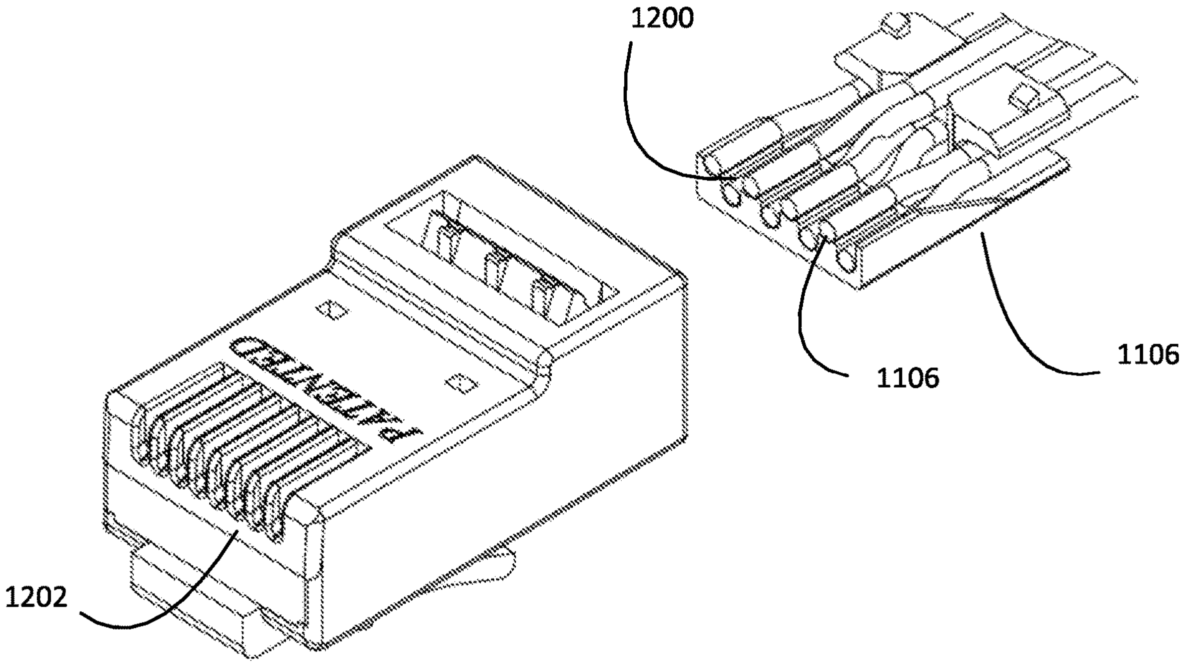
FIG. 18 shows another embodiment of the plug.

FIG. 18 shows another embodiment of the plug 1100. The load bar 1108 includes a plurality of openings 1202 through the front surface 1106 that allow the wires 1112 to pass through the openings 1200. In one embodiment, the load bar 1108 is configured to engage a cutting surface on a tool the cuts the wires such that the ends of the wires are co-planer with the front surface 1106. In another embodiment, the load bar 1108 is inserted into the plug 1110 such that the wires extend from the front surface 1102 of the plug 1100. In one embodiment, the modular plug 1100 is configured to engage a tool that cuts the wires such that the front ends of the wires are co-planer with the front surface 1102. In one embodiment, a plastic cap 1202 is placed in the opening 1104 after the load bar 1108 is inserted into the plug 1100.

What is claimed:

1. A modular plug system including:

a plug housing including a top surface, bottom surface and two opposing side surfaces, a front end and an opening opposite the front end, and a cavity extending from the front end to the opening in the back end;

a load bar sized to engage the cavity in a modular plug with the load bar including a first row of openings and a second row of openings, wherein, the first row of openings are each sized to each accommodate a wire, and each opening in the load bar is sized to concentrically align with one of a plurality of holes extending through the front end of the modular plug such that each wire passes through the holes and extends out past the front end of the modular plug, and each wire passed through one opening in the load bar is guided to a corresponding opening in the front of the modular plug.

2. The modular plug system of claim 1 wherein the load bar engages a portion of the cavity such that the load bar cannot move towards the opening.

3. The modular plug system of claim 1 wherein the the openings position the wires into the holes in the front end of the plug housing.

4. The modular plug system of claim 1 wherein the plug is an RJ 45 plug.

5. The modular plug system of claim 1 wherein the load bar has an upper surface, a lower surface and two opposing sidewalls.

6. The modular plug system of claim 1 wherein the openings in the load bar are alternately staggered.

7. The modular plug system of claim 1 wherein the front end of the housing includes a single row of openings.

8. The modular plug system of claim 1 wherein the front end of the housing includes multiple rows of openings that extend through the front end of the housing such that the wires extend beyond the front end of the housing.

9. The modular plug system of claim 1 wherein the load bar includes a single row of openings.

10. The modular plug system of claim 1 wherein load bar includes a bottom surface and two side surfaces.

* * * * *